United States Patent [19]

Kolb et al.

[11] Patent Number: 4,461,357

[45] Date of Patent: Jul. 24, 1984

[54] FURROWER WITH REMOVABLE SHARES

[75] Inventors: Walter Kolb, Betzdorf; Helmut Weid, Niederdreisbach, both of Fed. Rep. of Germany

[73] Assignee: Wolfe-Gerate GmbH, Fed. Rep. of Germany

[21] Appl. No.: 359,782

[22] Filed: Mar. 19, 1982

[30] Foreign Application Priority Data

Mar. 24, 1981 [DE]  Fed. Rep. of Germany ... 8108616[U]

[51] Int. Cl.³ ............................................. A01B 1/22
[52] U.S. Cl. .................................... 172/373; 172/378; 403/234; 403/190; 56/400.19
[58] Field of Search ............... 172/372, 373, 374, 378, 172/739, 741, 742, 743, 656, 126; 56/400.19, 17, 18, 20; 403/190, 191, 234, 236

[56] References Cited

U.S. PATENT DOCUMENTS

| 645,702 | 3/1900 | Arlaud | 172/378 |
| 1,548,906 | 8/1925 | Schroer | 56/400.19 |
| 1,768,080 | 6/1930 | Kurihara | 56/400.19 X |
| 2,804,109 | 8/1957 | Fatica | 172/372 X |

FOREIGN PATENT DOCUMENTS 465222  5/1950  Canada ............................... 172/656

Primary Examiner—Richard T. Stouffer
Assistant Examiner—William H. Honaker
Attorney, Agent, or Firm—Ostrolenk, Faber, Gerb & Soffen

[57] ABSTRACT

A furrower having shares that are displaceable on a support pipe which is connected to a tool attachment socket by a swivel joint, that can be fastened in any position. The fastening place is effected by a clamping device which can be released against spring action by a manual knob or button. A clamping member within the head of the share is pressed by means of its clamping section against the support pipe. This clamping section can be released by pushing the manual knob inwards. Preferred places of attachment to the support pipe are defined by notches. Each notch can accommodate one share, the share being engaged with the notch by means of a notch pin.

9 Claims, 4 Drawing Figures

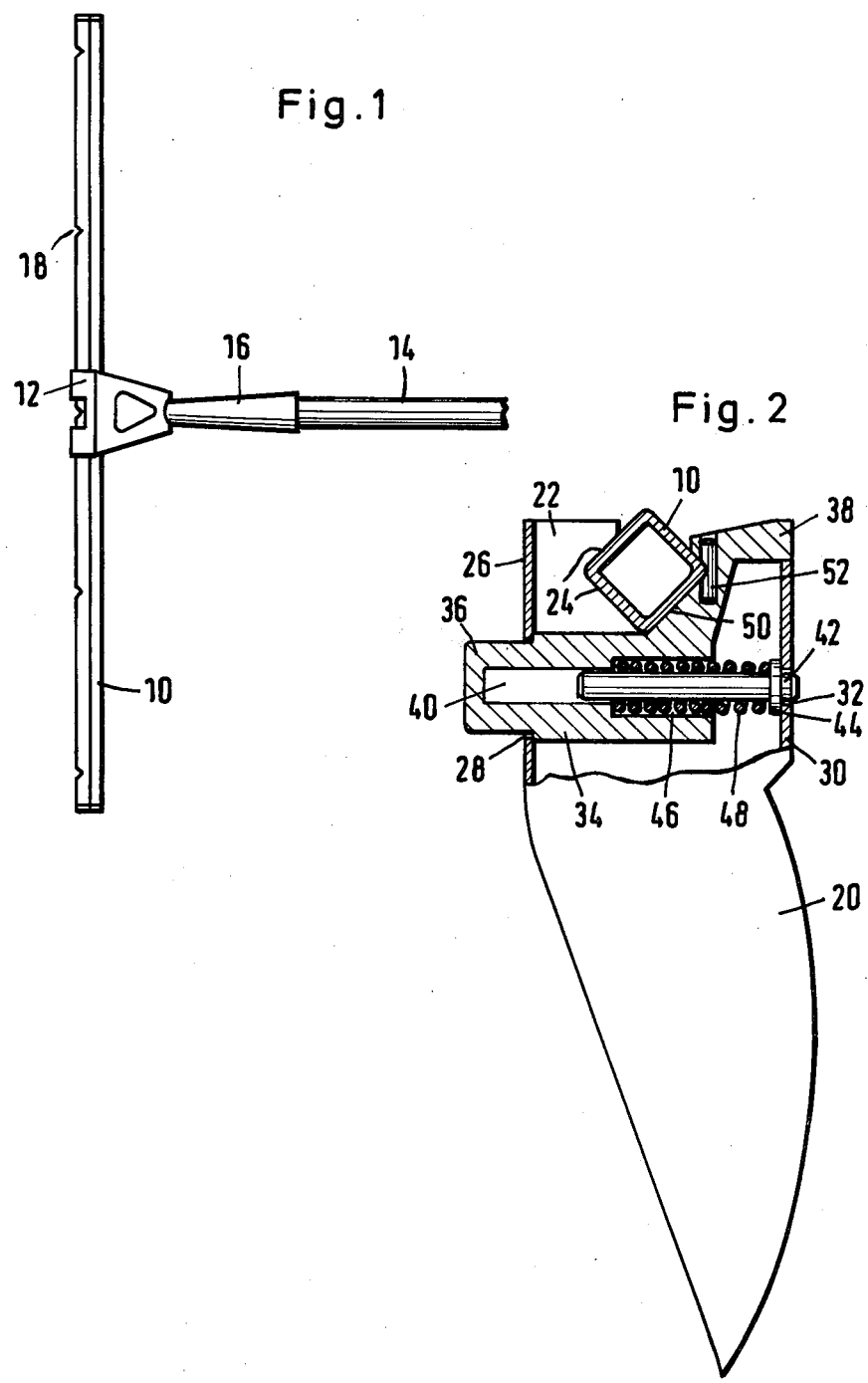

FURROWER WITH REMOVABLE SHARES

BACKGROUND OF THE INVENTION

The present invention relates to a furrower for forming seed furrows in beds, having a socket for connection to a support pipe and shares which are fixed against rotation but axially displaceable and removable from the support pipe. In one known furrower of this construction, the shares, in their head part, are provided with threaded holes by means of which fastening screws can be clamped against the support pipe. This type of screw attachment requires a considerable amount of time and labor in order to displace the shares on the support pipe or remove the share from the support pipe. This type of attachment furthermore has the disadvantage that the screw-thread connection can become frozen by dirt or rust so that the loosening or even the fastening of the shares requires considerable force.

SUMMARY OF THE INVENTION

The object of the present invention, therefore, is to improve a furrower of the type according to the general construction set forth above in such a manner that, while dependable attachment of the shares to the support pipe is possible easy displacement and mounting is nevertheless assured without screw-thread attachment.

According to the invention, the furrower comprises a support pipe, means for attaching the support pipe to a handle and a plurality of shares attached to the support pipe. A clamping member held within a head portion of each share has a manual release push knob extending from the clamping member and protruding outwardly from the head portion of the share. A spring urges the clamping member against the support pipe, thus fixing the shares against rotation on the support pipe but permitting axial displacement and removal of the shares from the support pipe. The head portions and the clamping members are configured with clamping section cutouts which match the shape of the support pipe. The support pipe has spaced apart detent notches into which detent projections from the shares fit. A guide pin which engages a guide hole in the head portion of the share permits displacement of the share along the guide pin. The guide pin may have a cup washer with the spring being placed around the guide pin so that one end is disposed against a shoulder in the guide hole, and the other end is disposed against the cup washer. The previously known furrowers, furthermore, had the disadvantage of a rigid attachment between the handle socket and the support pipe. As a result, the person using the furrower had to walk on the bed in which the furrows were to be formed. These disadvantages of known furrowers are avoided in accordance with the invention by the use of a swivel joint.

In this way it becomes possible to place the shaft or handle at an angle with respect to the support pipe so that the operator can walk alongside the bed and conveniently form the furrows in the longitudinal direction of the bed.

BRIEF DESCRIPTION OF THE DRAWINGS

One illustrative embodiment of the invention will be described below with reference to the drawing, in which:

FIG. 1 is a view of the furrower (without shares),

FIG. 2 is a view, partially in cross section, of a share seated on the support pipe together with a clamping device.

DETAILED DESCRIPTION OF THE PREFERRED EMBODIMENT

Figure 3:
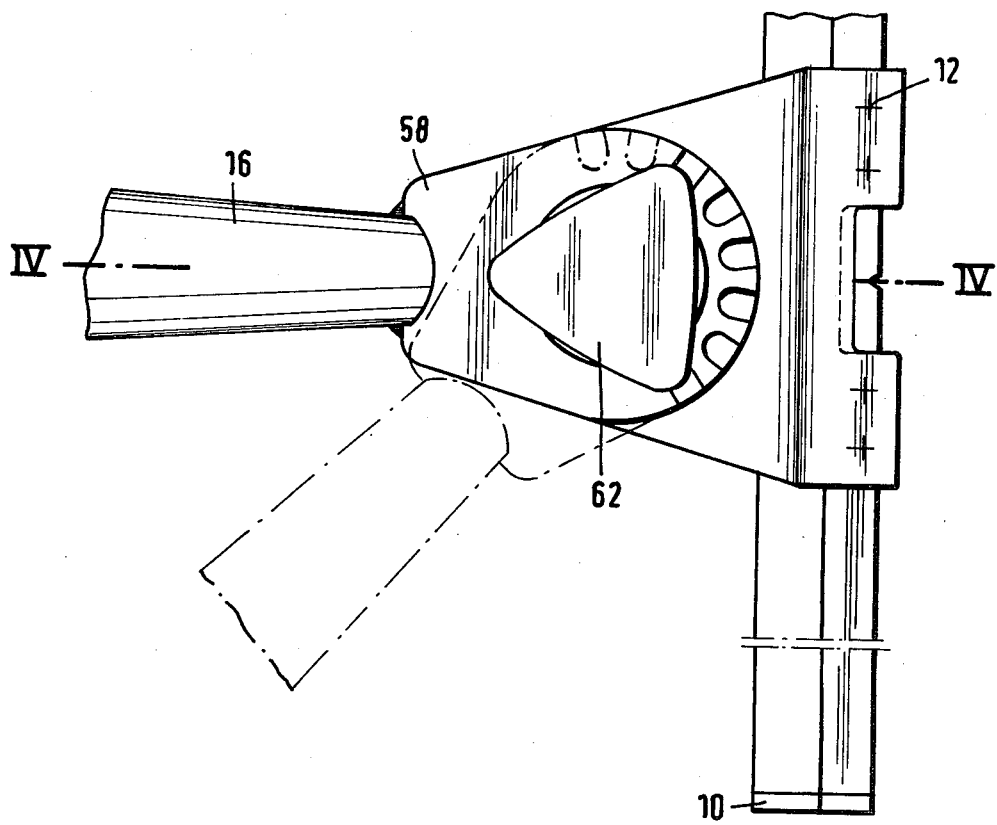
FIG. 3 is a view, on a larger scale, of the central portion of the furrower of FIG. 1.

The furrower of FIG. 1 has a support pipe 10 of square cross section to which an articulation plate 12 is welded, the plate being connected by a swivel joint with the tool attachment socket 16 which serves to receive the handle 14. (The swivel joint is shown in detail in FIGS. 3 and 4.) The support pipe 10 is provided, at predetermined uniformly spaced apart distances, with notches 18 into which detent means associated with the shares can engage, one of which shares is shown in partial section in FIG. 2. This share 20, which is formed of metal plate, has a head part having two sidewalls 22 (only one of which, that is the rear wall, is shown in FIG. 2), the sidewalls having a V-shaped notch 24 which matches the cross section of the pipe 10. The head part of each share 20 has an insertion hole 28 in its front wall 26 which is integral with the sidewalls 22 and furthermore a guide hole 32 arranged in the rear wall 30 and aligned axially with insertion hole 28. A manual push knob 36 of a plastic clamping member 34 protrudes outward through the insertion hole 28 in the front wall 26. An extension 38 of the clamping member 34 protrudes through a cutout in the rear wall 30 and is displaceable therein. The manual push knob 36 has a coaxial guide hole 40 for a guide pin 42 whose end enters into the guide hole 32. Between a cup washer 44 which is secured on the guide pin 42 and an annular collar of a widened portion 46 of the guide hole 40 there is arranged a coil compression spring 48 which surrounds the guide pin 42.

The clamping member 34 furthermore has a V-shaped clamping section 50 whose vertex is traversed by a cylindrical notch pin 52. This clamping section 50 is pressed by the spring 48 against the support pipe 10, the notch pin 52 lying in each case, in one of the notches 18.

In order to loosen the clamping device, the manual push knob 36 is pressed inward against the action of the spring 48 so that the V-shaped clamping section 50 is lifted off the support pipe 10. The share 20 can now be shifted as desired on the support pipe 10 or removed from it.

For mounting, the clamping member 34 can be inserted in simple fashion from the inside into the head part of share 20 which consists of bent metal plate, the clamping member 34 being fastened after engagement of the end of the guide pin 42 into the guide hole 32 and being capable of being displaced on the guide pin 42 in the direction of the axis thereof.

Figure 4:
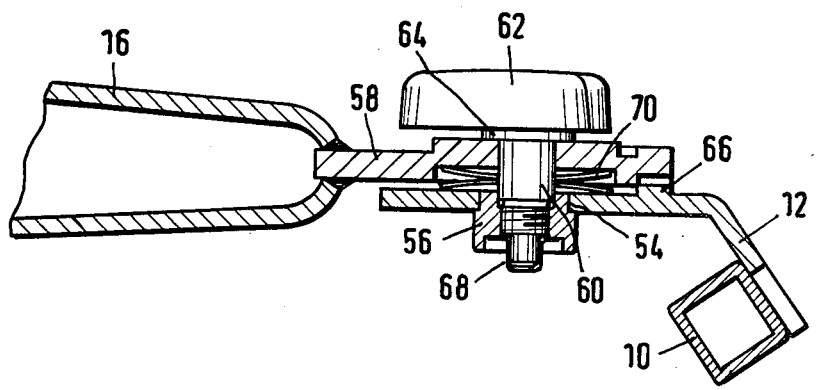
FIG. 4 is a section along the line IV—IV of FIG. 3.

The angularly bent articulation plate 12 is attached by spot welding in the middle of the support pipe 10. Referring to FIGS. 3 and 4, a nut 56 is force-fitted or welded into a hole 54 in the articulation plate 12. An articulation holder 58 which is connected to the attachment socket 16 of the tool lies above the articulation plate 12 and has an insertion hole through which a threaded bolt 60 which can be screwed into the nut 56 passes, the head 62 of said bolt being developed as an operating handle and resting, from above, via a clamping collar 64 against the articulation holder 58.

The articulation holder 58 has inwardly embossed detent indentations which match detent projections 66 on the articulation plate 12 and lie on a circular arc which is concentric to the axis of the joint. The threaded bolt 60 is secured against loosening by a locking element 68. A cup spring 70 is inserted between the articulation plate and the articulation holder.

The swivel joint, which can be locked by means of the set screw formed of bolt 60 and head 62 (hereinafter referred to as screw 60, 62), permits the handle to be set in different angular positions with respect to the support pipe 10. Two of such positions being shown in FIG. 3. If the screw 60, 62 is loosened, then the cup washer 70 presses the articulation holder 58 off the articulation plate 12 so that the detent projections 66 come out of engagement. By turning the joint to the left or right the angle between the tool socket and the tool is changed. When the desired position has been reached, the joint is locked by tightening the screw 60, 62. In this way furrows can be formed from a path alongside the bed without it being necessary to walk on the bed itself.

We claim:

1. A furrower for forming seed furrows in beds the furrower comprising:
   a support pipe;
   means for attaching the support pipe to a handle for supporting the furrower;
   a plurality of shares attached to the support pipe, each share having a head portion with an opening therein;
   a respective clamping member held within the head portion of each share, the clamping member having a surface for contacting the support pipe, the clamping member being movable between a clamping position at which the surface contacts the support pipe and a released position at which the surface is spaced away from the support pipe; when the clamping member is in the clamping position, the surface engaging the support pipe prevents motion of the share with respect to the support pipe; the share being removable from the support pipe when the clamping member is in the releasd position;
   a spring for urging the clamping member into the clamping position,
   a manual release push knob extending from the clamping member and the knob serving to move the clamping member from the clamping position to the released position when a force sufficient to overcome the urging of the spring is applied to the push knob;
   said support pipe being of cross section having angles, and in which both the head portion of the share and the clamping member have clamping section cutouts which mate with the angled shape of the support pipe.

2. A furrower according to claim 1, in which the support pipe has detent notches spaced along the support pipe; each clamping member includes a detent projection which fits into a respective one of the detent notches.

3. A furrower according to claim 2, in which the detent projections comprise cylindrical notch pins; each clamping member having a notch for receiving the cylindrical pin, the clamping member has a V-shaped clamping section with a vertex for mating with the cross section of the support pipe; the notch being located in the clamping member so that the pin is at the vertex when received in the notch.

4. A furrower according to claims 1, 2 or 3, in which the clamping member comprise a plastic body which is movable in the head portion of the respective share in a direction which is transverse to the support pipe, between the clamping position and the released position.

5. A furrower according to claim 4, further comprising a guide pin and a guide hole in the head portion of the share which receives the guide pin, the clamping member being displaceable on the guide pin, the guide hole also positioning and guiding the guide pin from the clamping position to the released position.

6. A furrower according to claim 5, in which the guide pin further comprises a cup washer, the spring is a coil compression spring around the guide pin; a shoulder in the guide hole of the clamping member and one end of the spring presses against the shoulder, and the other end of the spring is disposed against the cup washer of the guide pin.

7. A furrower according to claim 1, wherein the support pipe is of square cross section.

8. A furrower for forming seed furrows in beds, the furrower comprising:
   a support pipe;
   means for attaching the support pipe to a handle for supporting the furrower;
   a plurality of shares attached to the support pipe, each share having a head portion with an opening therein;
   a respective clamping member held within the head portion of each share, the clamping member having a surface for contacting the support pipe, the clamping member being movable between a clamping position at which the surface contacts the support pipe and a released position at which the surface is spaced away from the support pipe; when the clamping member is in the clamping position, the surface engaging the support pipe prevents motion of the share with respect to the support pipe; the share being removable from the support pipe when the clamping member is in the released position;
   a spring for urging the clamping member into the clamping position,
   a manual release push knob extending from the clamping member and the knob serving to move the clamping member from the clamping position to the released position when a force sufficient to overcome the urging of the spring is applied to the push knob;
   the furrower also comprising a handle for supporting the furrower; the means for attaching the support pipe to the handle comprises a tool attachment socket and a swivel joint arranged between the support pipe and the tool attachment socket; the swivel joint being lockable in a plurality of angular positions; and
   the swivel joint comprises an articulation holder connected to the tool attachment socket, an articulation plate connected to the support pipe, a nut which is provided on the articulation plate and a threaded bolt which can be screwed into the nut, the threaded bolt having a head which acts as a handle for turning the bolt.

9. A furrower according to claim 8, in which the articulation holder and the articulation plate are provided with respective cooperating detent indentations and detent projections arranged on a circular arc around the axis of the bolt, the indentations and projections engaging in formlocked manner in one another when the bolt is tightened, the swivel joint further comprising a compression spring in the shape of a cup spring arranged on the bolt between the articulation holder and the articulation plate for biasing the detent indentations and detent projections apart.

* * * * *